UNITED STATES PATENT OFFICE.

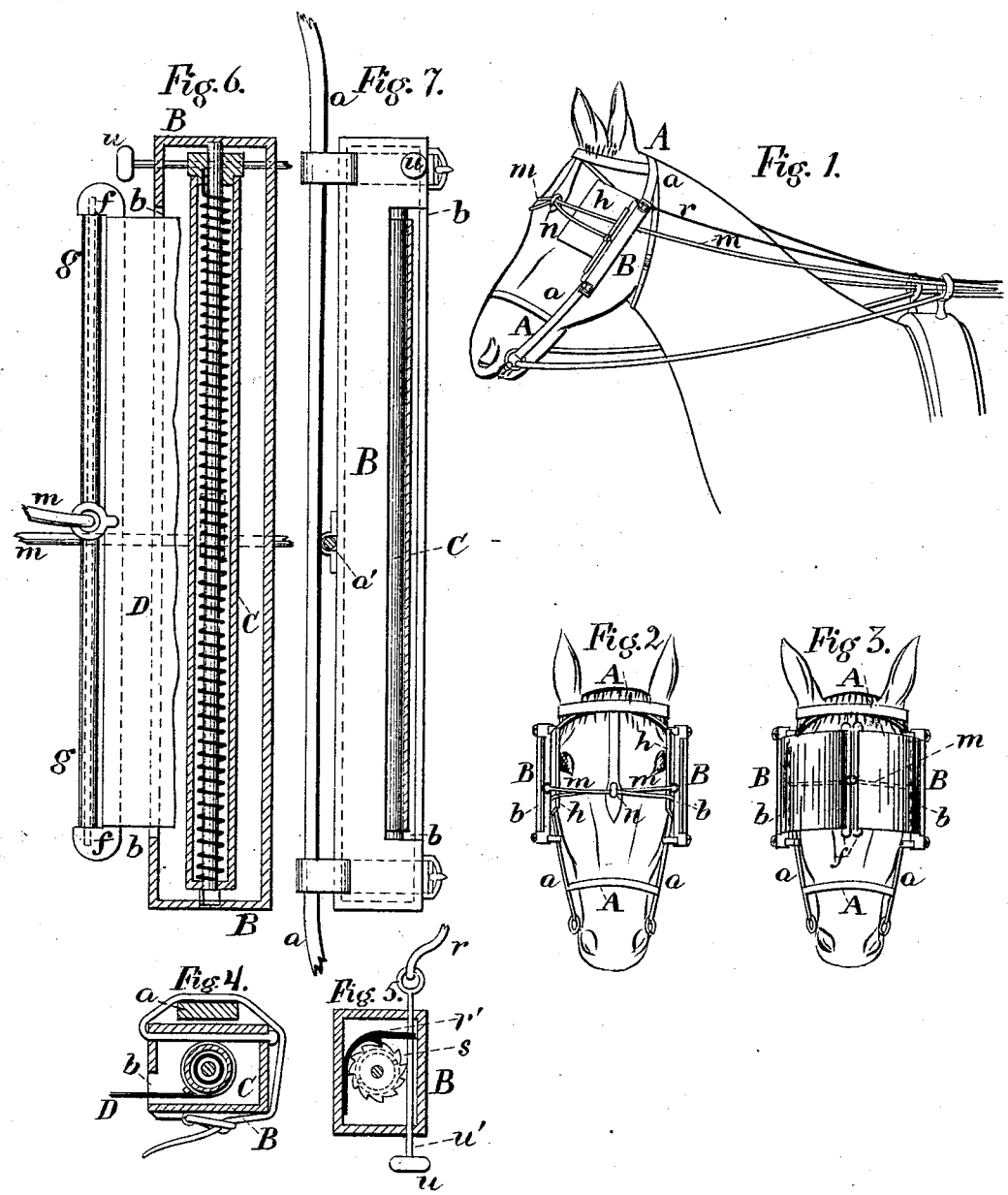

LIVINGSTON B. VAN KLEECK, OF NEW YORK, N. Y.

IMPROVEMENT IN APPARATUS FOR CONTROLLING RUNAWAY HORSES.

Specification forming part of Letters Patent No. 217,913, dated July 29, 1879; application filed May 15, 1879.

*To all whom it may concern:*

Be it known that I, LIVINGSTON B. VAN KLEECK, of the city, county, and State of New York, have invented certain Improvements in Apparatus for Controlling Runaway or Fractious Horses, of which the following is a specification.

This invention is based upon the discovery that by blindfolding a runaway or fractious horse the animal will be at once reduced to submission; and the object of said invention is to provide an efficient apparatus for the purpose indicated, which will be ready for instantaneous use in case of emergency, and which can be operated by the driver readily and quickly, however inexperienced said driver may be.

The invention comprises a novel combination, with a bridle or head-stall, of cords arranged to cross the face of the animal, certain rods attached to the curtains, the rollers of said curtains, and shells or cases which surround the rollers, and within which the curtains, when not extended in the active operation of the apparatus, are rolled or coiled out of the way, the whole being so constructed and provided as to enable the curtains to be readily drawn over the eyes of the animal when required to insure the perfect and speedy control of the latter.

The invention further comprises certain novel combinations of parts designed to most effectually insure the operation of the main or principal feature of the said invention just hereinbefore more particularly characterized.

Figures 1, 2, and 3 are views showing the position of the apparatus upon the head of the animal when said apparatus is applied to use. Figs. 4 and 5 are cross-sections; Fig. 6, a longitudinal section, and Fig. 7 a side view, of certain parts embraced in my said invention.

The bridle or headstall A may be of any suitable kind, and to each side thereof—as, for example, to each check-strap $a$—is attached an elongated case or shell, B, open at one side throughout its length, as shown at $b$. Within each of these shells B is a roller, C, which has its axial bearings in the ends of its shell B, and has attached to it a curtain, D.

The rollers C may have springs applied thereto to coil the curtains upon said rollers, as is done in a very common variety of window-curtains, and which, therefore, needs no specific description here; or said rollers may be of any other suitable character so long as they are fitted for having rolled or coiled thereon the curtains when the latter are not required for active use or operation, as hereinafter explained.

As shown in Figs. 1, 2, and 3, the shells B are longitudinal or parallel with the check-straps $a$ of the bridle or headstall A, so that each curtain being drawn out through the slot $b$ of its shell B (of course, unwinding from its roller C) will pass toward the center of the face of the animal, and therefore will cover the eyes thereof. Upon the outer end or edge of each curtain is provided a rod, $f$, which holds said edge straight, and affords support thereto in its position more or less approaching the vertical. From each of these rods extends a cord, $m$, which is carried across to the opposite side of the bridle or headstall, as shown more fully in Figs. 2 and 3, and passing through suitable guides—as, for instance, at $a'$ on the inner side of the opposite shell B, and thence rearward—may be carried through the terrets of the harness (if the animal be in harness) to the hands of the driver. The cords $m$ are, moreover, passed through a suspended loop, $n$, which depends from the crown-band of the bridle or headstall, and serves to support the said cords as they pass across the face of the animal, as described. Upon the outer edge of each rod $f$ is provided an anti-friction roller, $g$, the end bearings of which are at the two extremities of said rod. When the curtains are drawn out and extended from their shells B, as hereinbefore indicated, these anti-friction rollers traverse the outer surface of the blinders $h$ of the bridle or headstall, and, by preventing the dragging of the rods $f$ upon or in contact with the said blinders, greatly facilitate the aforesaid movement of the curtains.

The parts being constructed and applied as just set forth, and the curtains being coiled or rolled on their rollers within their shells B, the said curtains are out of sight, and do not in the least impede the vision of the animal; but should the animal become fractious or show a disposition to run away, it is only necessary to pull upon the cords m in order to draw the curtains outward from their shells B until they meet at the center of the face of the animal, as hereinbefore indicated. The curtains being thus made to closely cover both eyes of the animal, the latter is effectually blindfolded, and is at once subdued or reduced to submission.

When this result is fully accomplished the curtains are caused to retract or recede within their shells by a pull upon cords r, which are so arranged as to withdraw springs r' from ratchets s on the ends of the rollers, so as to permit the springs attached to said rollers to rotate the same to again coil or wind the curtains upon them; or, if preferred, the cords r may be dispensed with and the curtains started back and rewound, as just explained, by the hand of the horseman or driver pressed upon buttons n, which have stems n' so arranged as to bear against the springs r' and lift the same away from the ratchets when the buttons are pressed, as aforesaid. In such case, however, the horseman or driver must, of course, dismount for the purpose.

What I claim as my invention is—

1. The cords m, arranged to cross the face of the animal, in combination with the rods f of the curtains D, the rollers C, the shells B, and the bridle or headstall A, all substantially as and for the purpose herein set forth.

2. The anti-friction rollers g, in combination with the curtains D, the rollers C, shells B, and the bridle or headstall A, substantially as and for the purpose herein set forth.

3. The suspensory loops n of the bridle or headstall A, in combination with the cords or lines m, the shells B, rollers C, and curtains D, all substantially as and for the purpose herein set forth.

LIVINGSTON B. VAN KLEECK.

Witnesses:
HENRY F. PARKER,
WILLIAM R. WHITNEY.